June 16, 1936.    C. H. RICHARDS    2,044,592
TRUCK BODY HANDLING SYSTEM
Filed Jan. 15, 1935    4 Sheets-Sheet 4
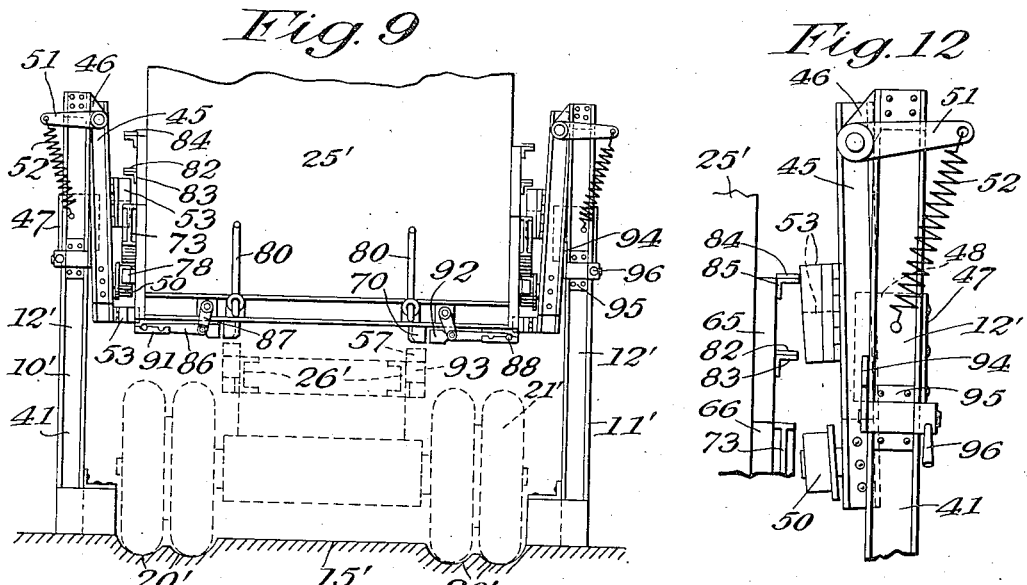
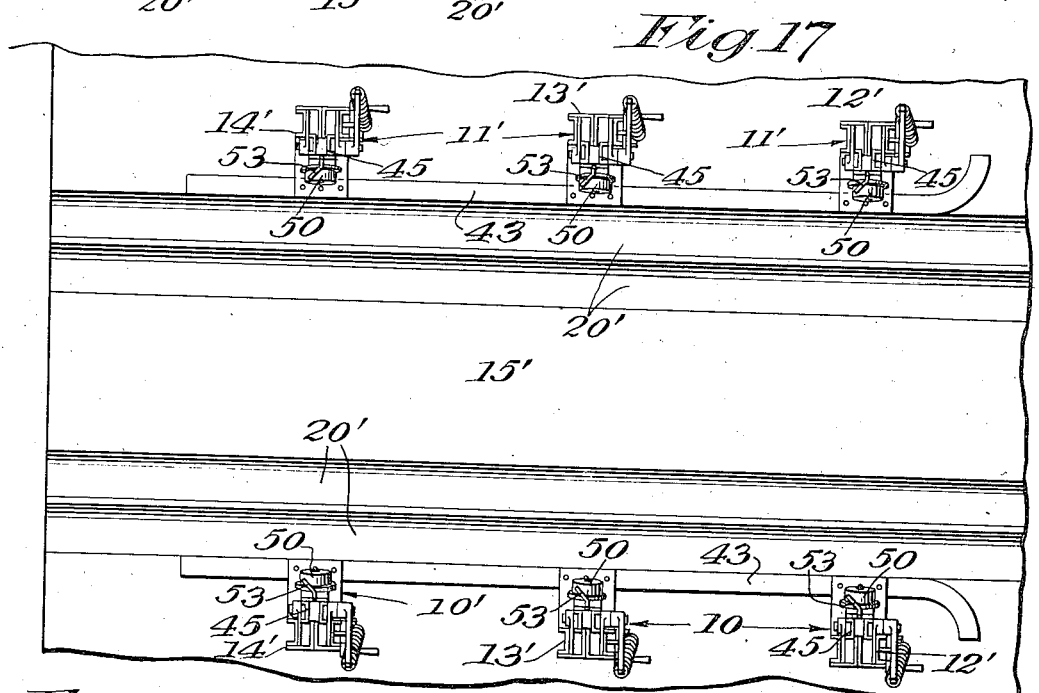
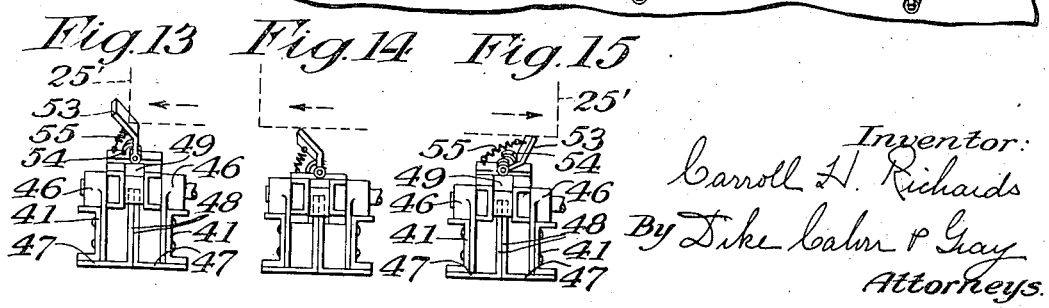
Inventor:
Carroll H. Richards
By Dike Calver & Gray
Attorneys.

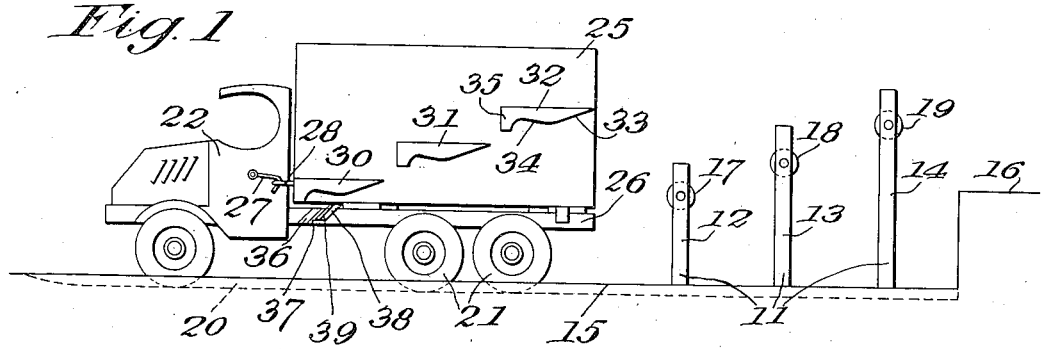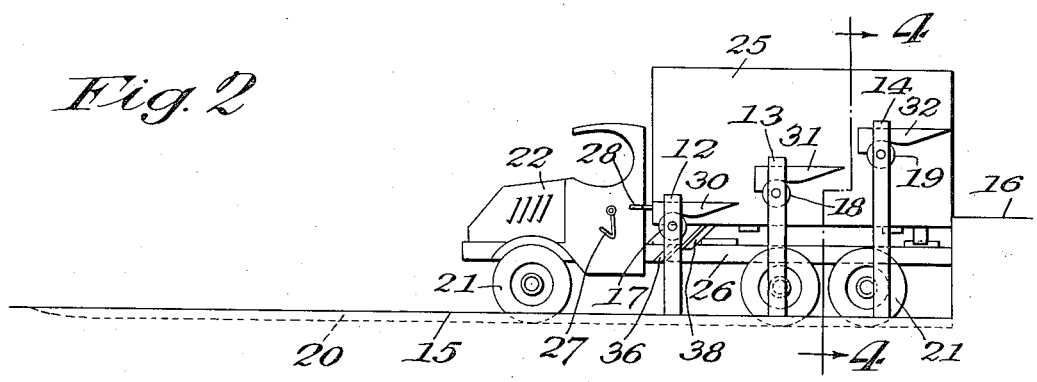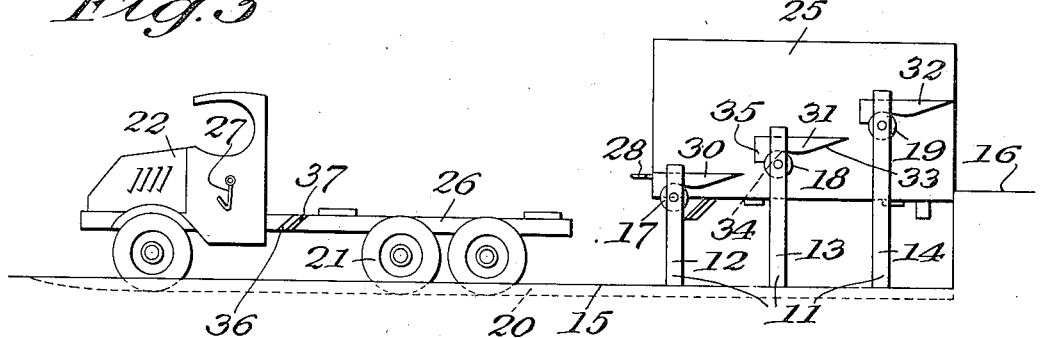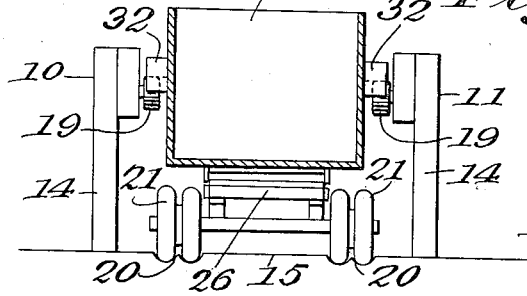

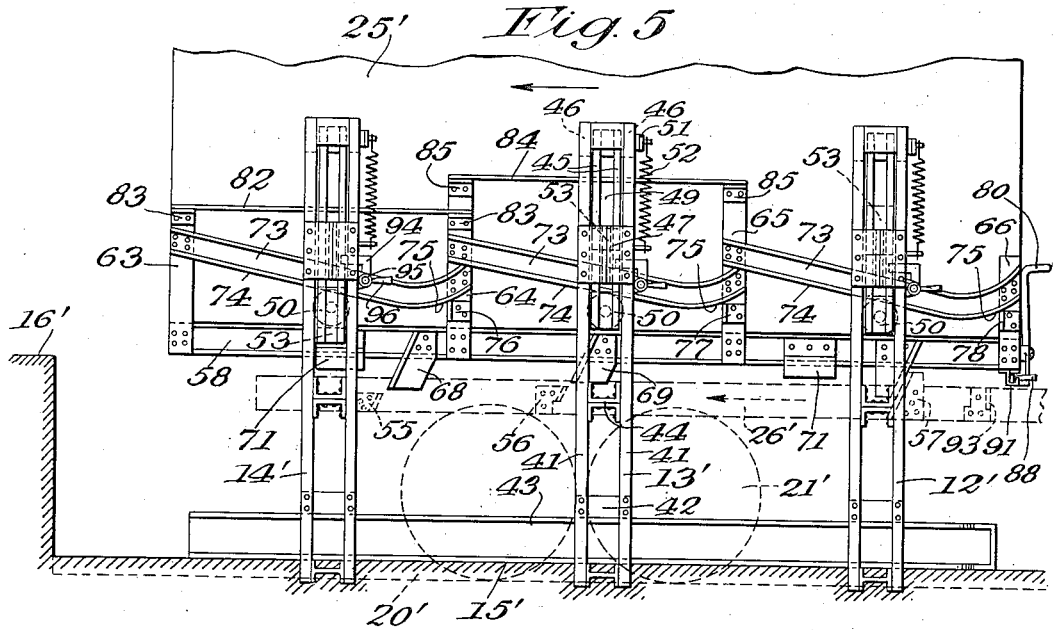
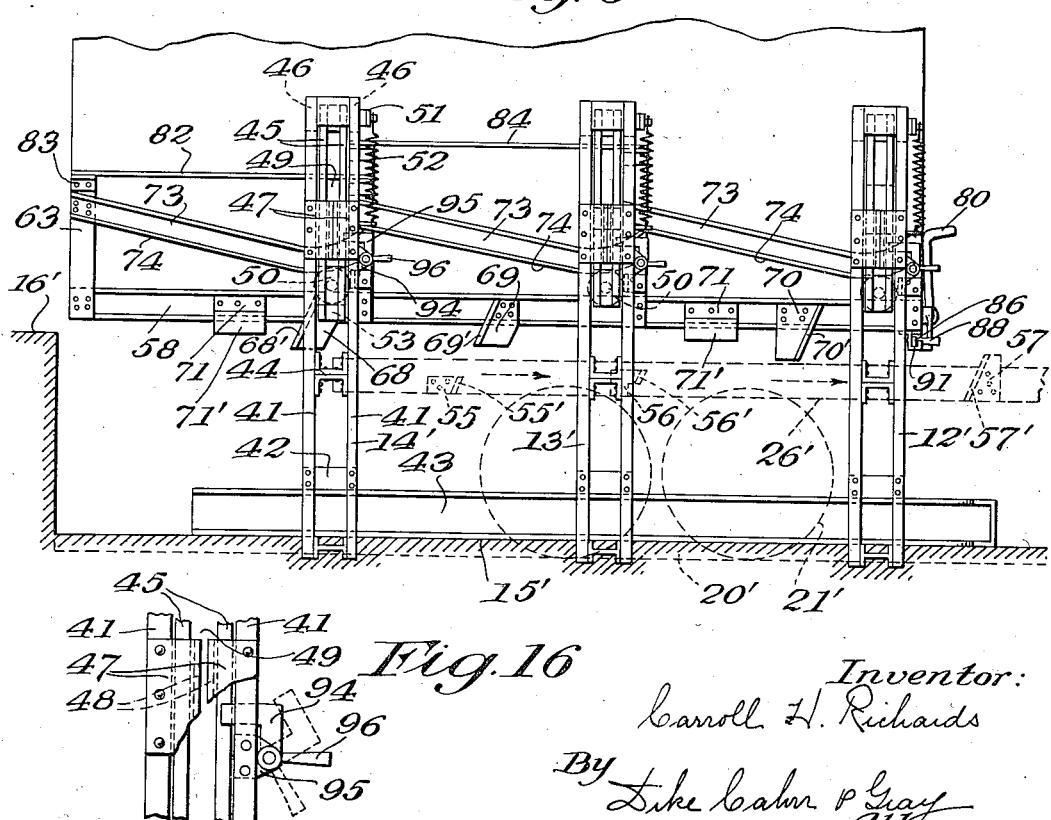

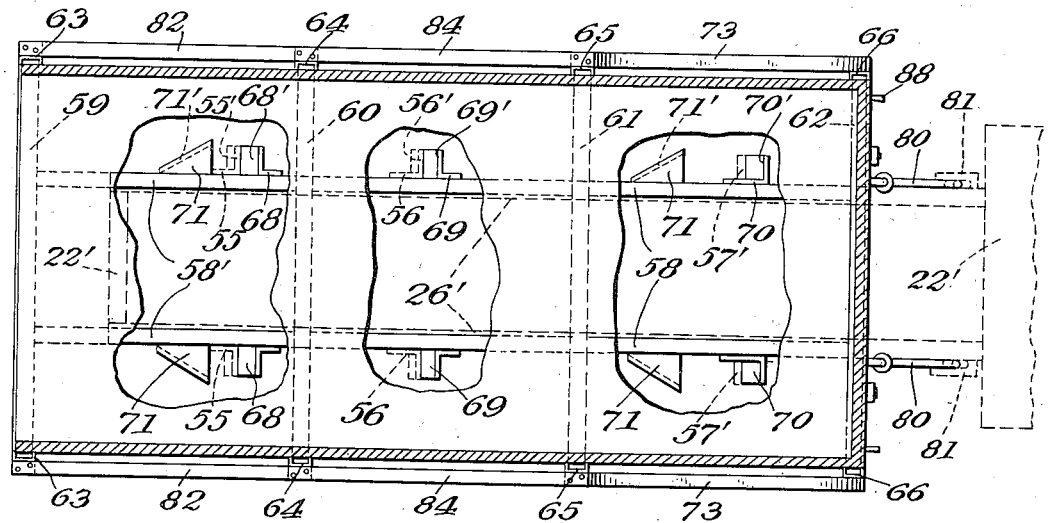
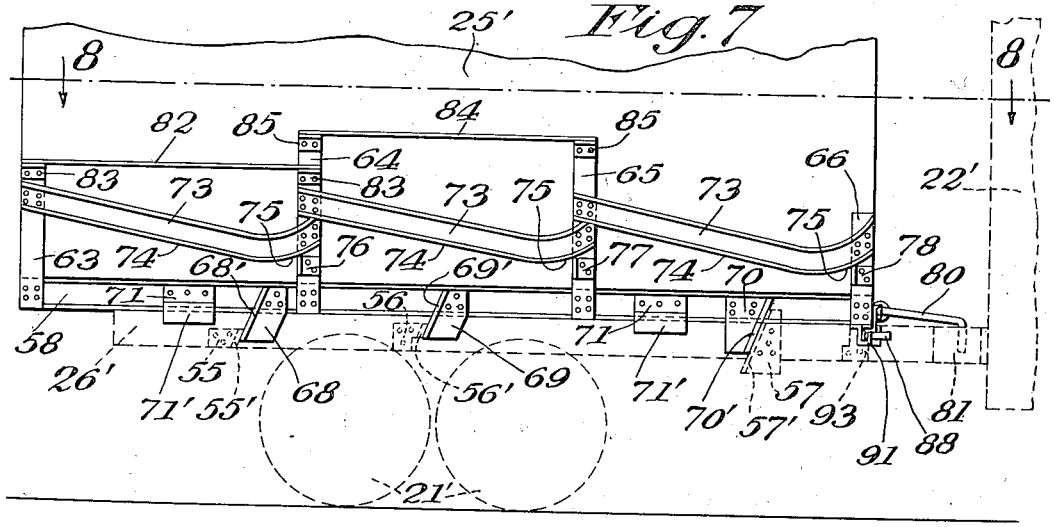
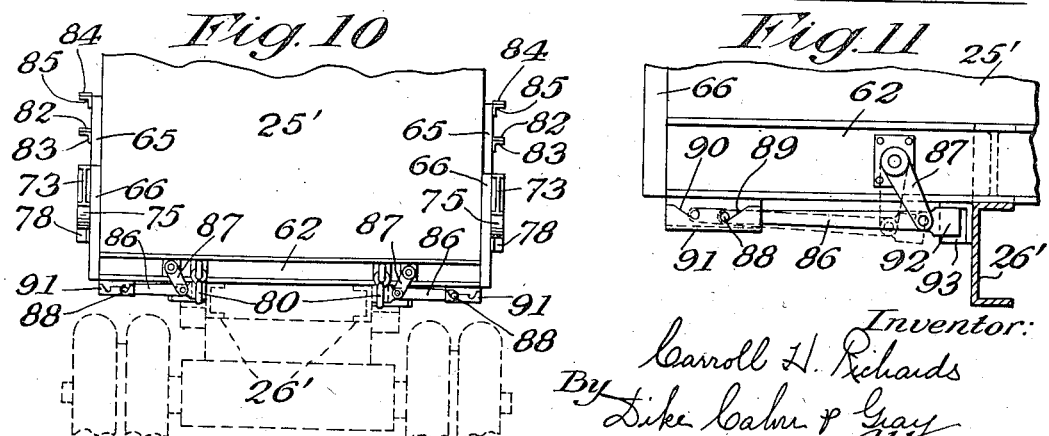

Patented June 16, 1936

2,044,592

UNITED STATES PATENT OFFICE 2,044,592

TRUCK BODY HANDLING SYSTEM

Carroll H. Richards, Wellesley, Mass.

Application January 15, 1935, Serial No. 1,930

12 Claims. (Cl. 254—45)

This invention relates to a system for handling detachable truck bodies and has for an object a reduction in the cost of handling commodities.

The invention contemplates a simple construction and arrangement of apparatus whereby a detachable truck body may be transferred from a truck chassis on to stationary spaced supports or vice versa so that the truck is available for other service while the body is being loaded or unloaded. The transfer of the body is effected by the combined action of forward or rearward movement of the truck chassis and cooperating members on the truck body and spaced supports, one of which, preferably, is provided with an inclined surface which causes the body to be raised or lowered gradually in response respectively to the rearward and forward movement of the body with the truck chassis. The transfer is effected quickly and with a minimum expenditure of power and without injury to either the truck or body.

The invention will be more clearly understood from the following description in conjunction with the accompanying drawings; in which, Figs. 1, 2, and 3 are side elevational views of a system for handling detachable truck bodies embodying the invention, illustrating the transfer of a detachable truck body between the truck chassis and spaced supports;

Fig. 4 is a sectional view taken on the line 4—4 of Fig. 2;

Figs. 5, 6, and 7 are side elevational views illustrating a modified system embodying the invention for handling detachable truck bodies, illustrating the relation of the parts in different positions;

Fig. 8 is a sectional view taken on the line 8—8 of Fig. 7;

Fig. 9 is a front elevational view of the apparatus illustrated in Figs. 5 to 8 inclusive;

Fig. 10 is a front elevational view of a portion of the apparatus shown in Fig. 9;

Fig. 11 is an enlarged detail view of a portion of the apparatus shown in Fig. 10;

Fig. 12 is an enlarged detail view of a portion of the apparatus shown in Fig. 9;

Figs. 13, 14, and 15 are detail plan views of the apparatus shown in Fig. 12 illustrating different positions of the parts;

Fig. 16 is a detail view of a portion of the apparatus as viewed from the left of Fig. 12; and Fig. 17 is a plan view of a portion of the apparatus shown in Figs. 5 to 9 inclusive.

One embodiment of the invention is illustrated in Figs. 1 to 4 inclusive and comprises supports 10 and 11 spaced to permit a truck chassis to be moved therebetween. Each of the supports 10 and 11 includes three upright members 12, 13, and 14 mounted upon a suitable foundation, such as a roadway 15, adjacent a loading platform 16. Rolls 17, 18, and 19 are suitably mounted upon the uprights 12, 13, and 14 respectively, so as to project into the space between the supports 10 and 11. The rolls 17, 18, and 19 are positioned at different distances from the roadway 15. Tracks 20 are formed in the roadway 15 so as to extend into the space between the supports 10 and 11 and serve to guide the wheels 21 of the truck 22.

A truck body 25 is adapted to be detachably mounted upon the longitudinal frame members 26 of the truck chassis. The body 25 is secured upon the truck chassis by hooks 27 pivotally carried on the chassis and adapted to engage eyes 28 carried by the body 25. Members 30, 31 and 32 are fixed to each of the opposite sides of the body 25 and are spaced vertically to correspond with the vertical spacing of the rolls 17, 18, and 19. Each of the members 30, 31, and 32 is provided with a surface having an upwardly and rearwardly inclined portion 33 and an upwardly and forwardly inclined portion 34. An abutment 35 is mounted upon the body 25 adjacent the forward end of each of the surfaces 34. A plate 36 is mounted upon each of the longitudinal members 26 of the truck chassis and each plate 36 is provided with an outwardly extending flange 37 which is inclined upwardly and forwardly. A pair of plates 38 are mounted upon the body 25 so as to depend therefrom and each is provided with a laterally extending flange 39 inclined upwardly and forwardly and is adapted for engagement with the flange 37 of the plate 36.

When the body 25 is positioned upon the chassis of the truck 22 as shown in Fig. 1, its weight will deflect the truck springs (not shown) and these springs will exert an upwardly directed force tending to raise the body. If it is desired to transfer the body 25 from the truck 22 on to the supports 10 and 11, the hooks 27 are released. The truck 22 is then backed into the space between the supports 10 and 11 and is guided thereinto by causing the wheels 21 to engage the tracks 20. As the body 25 enters the space between the supports 10 and 11, the surfaces 33 of the members 30, 31, and 32 will be brought substantially simultaneously into engagement with the wheels 17, 18, and 19 respectively and the body will gradually move upward because of the cam-like action of the inclined surfaces 33 upon the rolls. This upward movement of the body 25 is assisted by the action of the truck springs because as soon as the upward movement of the body 25 begins the load upon the truck springs is gradually decreased thereby permitting the springs to exert a lifting action upon the body.

As the rearward movement of the body 25 continues, the body will be raised out of engagement with the truck chassis and the rolls 17, 18, and 19 will finally pass the low point of the surfaces 33 and will engage the surfaces 34 of the members 30, 31, and 32 respectively. As soon as the rolls 17, 18, and 19 engage the surfaces 34, the body 25 will descend slightly, due to its own weight, until the rolls 17, 18, and 19 are brought into engagement with one or all of the abutments 35 and prevent further movement of the body and is automatically locked in position. The truck 22 is now moved out of the space between the supports 10 and 11 from the position shown in Fig. 2 to that shown in Fig. 3 and is available for receiving another detachable body.

If the body 25 is positioned upon the supports 10 and 11 as illustrated in Fig. 3 and it is desired to transfer it on to the truck chassis, the truck is backed into the space between the supports 10 and 11 and beneath the body 25 as illustrated in Fig. 2. The hooks 27 are now brought into engagement with the eyes 28 to connect the truck and body. The truck is now moved forward and in so doing the body 25 is caused to move upwardly until the rolls 17, 18, and 19 have passed the intersection of the surfaces 33 and 34. As soon as the rolls 17, 18, and 19 engage the surfaces 33 of the members 30, 31, and 32 the body begins to descend toward the truck chassis and is gradually brought into engagement therewith.

The structure embodying the invention as illustrated in Figs. 5 to 17 comprises spaced supports 10' and 11' each including upright pillars 12', 13', and 14'. Each of the pillars 12', 13', and 14' comprises a pair of spaced channel members 41 which are connected by a bracket 42 to one of the rails 43 positioned upon the roadway 15' at opposite sides of the tracks 20'. The channel members 41 are also connected together by brackets 44. An arm 45 is pivotally mounted in bearings formed in brackets 46 secured to each of the channel members 41. Brackets 47 are secured to each of the channel members 41 and are provided with flanges 48 adapted to extend into a slot 49 in the arm 45 and serve to guide the latter in its movement. A roll 50 is suitably mounted upon each arm 45. A lever 51 is secured to each arm 45 near its upper end and is connected at its outer end to one end of a spring 52 the other end of which is secured to one of the channel members 41. A plate 53 is hinged upon each arm 45 and is provided with an abutment 54 adapted to engage the arm and limit movement of the plate 53 in one direction. A spring 55 is connected at one end to the plate 53 and at its other end to the arm 45 and normally holds the abutment 54 in engagement with the arm 45 but permits the plate 53 to swing from the position shown in Fig. 14 to that shown in Fig. 15.

The arm 45 which is carried by each of the pillars 12', 13', and 14' is of similar construction in that the roll 50 is similarly positioned thereon. The plates 53 which are hinged to the arms 45 which are carried by the pillars 12', 13', and 14' are positioned at different heights respectively so as to be engaged by different members carried by a detachable body as described hereinafter.

The forward end of each of the rails 43 is flared outwardly so as to guide the wheels 21' of the truck 22' onto the tracks 20'. The chassis of the truck 22' is provided with longitudinal frame members 26' which are adapted to receive a detachable body 25'. Plates 55, 56, and 57 are suitably secured to the outer side of each of the chassis members 26' and are provided with outwardly extending flanges 55', 56', and 57', each inclined upwardly and forwardly.

The body 25' is provided with longitudinal sills 58 and transverse sills 59, 60, 61, and 62. Plates 68, 69, and 70 are suitably secured to each of the longitudinal sill members 58 and are provided with outwardly extending flanges 68', 69', and 70' inclined upwardly and forwardly and adapted for engagement with the flanges 55', 56', and 57' respectively. A pair of plates 71 are secured to the sill members 58 near the forward and rear ends thereof and each is provided with a depending flange 71' flared outwardly and forwardly.

Uprights 63, 64, 65, and 66 are secured to the opposite ends of the transverse sills 59, 60, 61, and 62 respectively. A plurality of members 73 are secured to the uprights 63, 64, 65, and 66 so as to extend longitudinally of the body on each side thereof. Each of the members 73 is provided with an upwardly and rearwardly inclined surface 74 and an upwardly and forwardly inclined surface 75 intersecting the surface 74. Brackets 76, 77, and 78 are secured to the uprights 64, 65, and 66 adjacent the forward ends of the surfaces 75. A bar 82 extends between the uprights 63 and 64 at each side of the body and is secured at its ends to brackets 83 secured to the uprights. A bar 84 extends between the uprights 64 and 65 at each side of the body and is secured at its ends to brackets 85 secured to the uprights.

A lock is provided adjacent the forward end of each of the frame members 26' for locking the body 25' upon the chassis frame members 26' and each comprises an arm 86 pivotally connected to a lever 87 which is pivotally carried by the transverse sill 62. A pin 88 extends forwardly from one end of the arm 86 and is adapted to engage one of the oppositely inclined slots 89 and 90 formed in the upper edge of one of the legs of a plate 91 which is secured to the sill 62. The other end of the arm 86 is provided with a flattened latch portion 92 adapted to engage the front surface of a plate 93 fixed to the frame member 26'.

A latch member 94 is pivotally carried in a bracket 95 secured upon one of the channel members 41 of the pillars 12', 13', and 14' and is provided with a handle member 96 by which it may be moved so as to abut the outer side of the arm 45 to prevent outward movement of the latter, as shown in Figs. 9 and 16. A pair of hooks 80 are secured to the body 25' and are adapted to engage hook members 81 carried by the frame members 26' of the truck chassis.

The operation of the embodiment of the invention illustrated in Figs. 5 to 17 is similar to the operation of the embodiment illustrated in Figs. 1 to 4, in that when the truck 22' carrying the body 25' is backed into the space between the supports 10' and 11', the upwardly and rearwardly inclined surfaces of the members 73 are brought into engagement with the rolls 50 carried by the arms 45 to cause the body to be moved upwardly off from the truck chassis. Thus, as the body 25' is moved rearwardly into the space between the supports 10' and 11' the rods 82 engage the plates 53 carried upon the arms 45 which are pivotally mounted upon the pillars 12' as illustrated in Fig. 13 and cause the arms 45 to be moved outwardly from the position shown in Fig. 13 to that shown in Fig. 14 to provide clearance between the rolls 50 and the body 25'. Upon further rearward movement of the body 25', the rods 82 engage the plates 53 upon the arms 45 which are carried by the pillars 13' and the rods 84 engage the plates 53 carried by the arms 45 mounted upon the pillars 12' thereby moving the arms 45 outwardly from the position shown in Fig. 13 to that shown in Fig. 14 to provide clearance between the rolls 50 and the body 25'. Upon further rearward movement of the body the lower rear end of the latter is brought into engagement with the plates 53 on the arms 45 which are carried by the pillars 14' to cause the arms 45 to move outwardly and provide clearance between the rolls 50 and the truck body. As soon as the body 25 has moved rearwardly an amount such as to bring the last mentioned plates 53 out of contact with the uprights 63, the springs 52 cause the arms 45 to move inwardly and permit the rolls 50 to engage the inclined surfaces 74 of the rearmost members 73. At the same time, the plates 53 carried upon the arms 45 which are pivotally mounted upon the pillars 13' and 12' are positioned forwardly of the upright 64 and 65 respectively thereby permitting the springs 52 to move the arms 45 inward and permit the rolls 50 to engage the inclined surfaces 74 upon the intermediate members 73 and the front members 73. Upon further rearward movement of the body 25' the latter is raised off the truck chassis in a manner similar to that described in the embodiment illustrated in Figs. 1 to 4 until the rolls 50 are finally engaged by the abutments provided by the plates 76, 77, and 78. It will be understood that as the truck 22' is moved rearwardly this rearward movement is imparted to the body 25' by the engagement of the inclined flanges 57' with the inclined flanges 70'.

If it is desired to transfer the body 25' from the supports 10' and 11' on to the chassis of the truck 22', the latter is moved into the space between the supports 10' and 11' to permit the hooks 80 to be engaged with the hook members 81. If in moving the truck into position beneath the body 25' the truck body and the truck chassis are out of alinement the rear ends of the chassis frame members 26' will engage the depending flanges 71' on the plates 71 to bring about proper alinement between the body 25' and the truck chassis. The truck is now moved forward and the body 25' is gradually lowered upon the truck chassis as described in connection with the operation of the embodiment illustrated in Figs. 1 to 4. As the body 25' is lowered toward the chassis, the inclined flanges 68', 69', and 70' are brought into engagement with the inclined flanges 55', 56', and 57' respectively, which serve the additional function of locking the body upon the truck chassis. When the body 25' has been removed from the supports 10' and 11', the arms 86 are moved to bring the pins 88 out of engagement with the slots 90 and into engagement with the slots 88 thereby positioning the latch member 92 in front of the plate 93 which serves as an additional means for locking the body upon the truck chassis.

I claim:-

1. In combination, a truck body adapted to be detachably carried upon a truck chassis, supports spaced to permit the truck chassis to be driven therebetween, cooperating members carried by said body and supports adapted to be brought into engagement by moving said body between said supports while on said chassis, said members being arranged to cause said body to be raised above said chassis and thereafter lowered slightly when the body is being moved into the space between said supports and to cause the body to be raised slightly and thereafter lowered when being moved out of the space between said supports, means for causing said body to move with said chassis and in the same direction as said chassis is moved into and out of the space between said supports.

2. In combination, a truck body adapted to be detachably carried upon a truck chassis, supports spaced to permit the truck chassis to be driven therebetween, a plurality of members carried by said body on each side thereof each having a surface the major portion of which is inclined upward and rearward of the body, and a plurality of members carried by said supports and arranged to engage said inclined surfaces when said body, while on said chassis, is moved into the space between said supports, the lowest point of each of said inclined surfaces being intermediate the ends thereof.

3. In combination, a truck body adapted to be detachably carried upon a truck chassis, supports spaced to permit the truck chassis to be driven therebetween, a plurality of members carried by said body on each side thereof each having a surface the major portion of which is inclined upward and rearward of the body, a plurality of members carried by said supports and arranged to engage said inclined surfaces when said body, while on said chassis, is moved into the space between said supports, the lowest point of each of said inclined surfaces being intermediate the ends thereof, and an abutment adjacent the forward end of one of said members having said inclined surface.

4. In a system for handling detachable truck bodies, stationary supports spaced to permit a truck chassis to be driven therebetween, a plurality of arms pivotally carried by each of said supports, a roll carried by each of said arms, and resilient means acting upon each of said arms tending to urge the same into the space between said supports.

5. In a system for handling detachable truck bodies, stationary supports spaced to permit a truck chassis to be driven therebetween, a plurality of arms pivotally carried by each of said supports, a roll carried by each of said arms, resilient means acting upon each of said arms tending to urge the same into the space between said supports, a member hinged upon each of said arms, an abutment limiting movement of said member in one direction, and resilient means resisting movement of said member in the opposite direction.

6. A truck body adapted to be detachably mounted upon a truck chassis, said body having a plurality of members on each side thereof each having a surface the major portion of which is inclined upward and rearward of the body, the lowest point of each of said inclined surfaces being intermediate the ends thereof.

7. A truck body adapted to be detachably mounted upon a truck chassis, said body having a plurality of members on each side thereof each having a surface the major portion of which is inclined upward and rearward of the body, the lowest point of each of said inclined surfaces being intermediate the ends thereof, and an abutment adjacent the forward end of one of said members.

8. In combination, a truck body adapted to be detachably carried upon a truck chassis, supports spaced to permit the truck chassis to be driven therebetween, a plurality of members carried by said body on each side thereof each having a surface the major portion of which is inclined upward and rearward of the body, a plurality of arms pivotally carried by each of said supports, and a roll carried by each of said arms adapted to engage one of said inclined surfaces.

9. In combination, a truck body adapted to be detachably carried upon a truck chassis, supports spaced to permit the truck chassis to be driven therebetween, a plurality of members carried by said body on each side thereof each having a surface the major portion of which is inclined upward and rearward of the body, a plurality of arms pivotally carried by each of said supports, a roll carried by each of said arms adapted to engage one of said inclined surfaces, resilient means acting upon each of said arms tending to move the same into the space between said supports, and means carried by said body for causing said rolls to move out of the path of said body as the latter is moved into the space between said supports.

10. In combination, a truck body adapted to be detachably carried upon a truck chassis, supports spaced to permit the truck chassis to be driven therebetween, cooperating members carried by said body and supports adapted to be brought into engagement by moving said body between said supports while on said chassis, said members being arranged to cause said body to be raised above said chassis when the body is being moved into the space between said supports and to cause the body to be lowered when being moved out of the space between said supports, and cooperating means carried by said body and chassis for bringing said body and chassis into alignment when said chassis is moved in the space between said supports while said body is carried by said supports.

11. In combination, a truck body adapted to be detachably carried upon a truck chassis, supports spaced to permit the truck chassis to be driven therebetween, a plurality of members carried by said body on each side thereof each having a surface the major portion of which is inclined upward and rearward of the body, a plurality of arms pivotally carried by each of said supports, a roll carried by each of said arms adapted to engage one of said inclined surfaces, and means for bringing said body and chassis into alignment when said chassis is moved into the space between said supports while said body is carried by said supports.

12. In combination, a truck body adapted to be detachably carried upon a truck chassis, supports spaced to permit the truck chassis to be driven therebetween, a group of a plurality of longitudinally spaced members carried by said body on each side thereof, a group of a plurality of longitudinally spaced members carried by said supports, the members of the group of members carried by said body being arranged to cooperate with the members of the group of members carried by said supports to cause said body to be raised above said chassis when the body is being moved into the space between said supports and to cause the body to be lowered when being moved out of the space between said supports, and means carried by said body and chassis adapted to cooperate as said body is lowered upon said chassis to prevent movement relative to said chassis in a horizontal plane.

CARROLL H. RICHARDS.